Patented Nov. 23, 1926.

1,608,341

UNITED STATES PATENT OFFICE.

WALTHER SCHRAUTH, OF WILMERSDORF, NEAR BERLIN, AND HERMANN HAUSAMANN, OF RODLEBEN, NEAR ROSSLAU, GERMANY.

FAT-SPLITTING AGENT AND PROCESS FOR SPLITTING FATS.

No Drawing. Application filed December 12, 1924, Serial No. 755,422, and in Germany January 5, 1924.

The organic sulpho acids known as fat-splitting agents comprise generally viscous, tar-like products which can only with difficulty be obtained in a pure state and are very difficult to dose accurately. Efforts have therefore been made to employ salts of these sulphoacids for the splitting of fats, oils, waxes and such like. Though in this way a certain amount of progress has been made, even these products still have grave disadvantages, as the presence of inorganic salts during the splitting process seriously impairs the capacity for splitting the sulpho acids in question.

It has now been found that by mixing the viscous sulpho acids with porous materials, such for example as kieselguhr, fuller's earth, animal charcoal or the like, pulverulent products are obtained, which exert a far better action than the salts of the sulpho acids the use of which for splitting fats, oils, waxes and such like is known; in fact in certain cases they are able not inconsiderably to surpass even the sulpho acids employed without addition of the said materials. It has also been ascertained that the new fat splitting agents yield products of splitting (fatty acids and glycerine or generally alcohols) which almost completely do not show the dark colouring that occurs with the usual processes.

The porous materials absorb the sulpho acids.

The new process of splitting fats, oils, waxes consists in adding the new fat splitting agents to a mixture or emulsion of the fats etc. to be split with water to which an acid, preferably an inorganic, as sulphuric acid, may be added. The mixture may be heated.

Salts unable to crystallize and such derivatives of the sulphoacids which by the action of water in the process of splitting fats are transformed into sulphoacids, as the sulphoacid-chlorids may be used. Also derivatives of the sulphoacids containing in the nucleus other substituents as chlorine, the nitrogroup, may be fixed with porous materials.

Example.—1000 kilograms of beef tallow are boiled, after the usual purification, with the addition of about 75 kilograms water and 1.5 kilogram sulphuric acid 60° Bé. with 15 kilograms of a fat splitting agent produced by mixing one part of Twitchells' reagent and 1.5 parts of kieselguhr. The preparation of the splitting agent is effected by mixing the components until the liquid is nearly completely absorbed and a pulverulent product is obtained. After only 12 hours a degree of splitting of about 90% is produced which can be increased to approximately 100% if the aqueous layer is drawn off and the splitting process, if necessary after new addition of water, acid and splitting agent, is continued for a few hours longer. The fatty acids obtained in this way are light colored.

The splitting agent according to the present invention may also be prepared by mixing other fatty aromatic sulphoacids capable of splitting fats, oils or waxes or mineral oil sulphoacids with the porous materials. One may also mix with the porous substances aromatic sulphoacids, especially derived from hydrocarbons having several benzene nuclei which are in the nuclei substituted by one or more hydrocarbon groups for instance, isopropylnaphthalene sulphonic acid, see the Patent No. 1,576,005. One may also use the salts of the said acids or derivatives containing besides the sulpho group other groups as for instance, halogens, nitro groups, carboxylic groups, etc. One may use sulpho acids which contain hydrocarbon groups derived from secondary alcohols or hydrocarbon groups, one or more hydrogen atoms in which is substituted by other groups. The preparation and use of such splitting agents is described in the Patent No. 1,576,005, issued March 9, 1926.

We claim:—

In the process of splitting fats, oils and waxes with organic sulphocompounds the step of mixing with such organic sulpho-compounds, porous materials which absorb the former without reacting chemically therewith yielding a pulverulent product.

In testimony whereof we hereunto affix our signatures.

Prof. Dr. WALTHER SCHRAUTH.
HERMANN HAUSAMANN.